Dec. 18, 1934.  R. L. GILLES  1,985,162
PORTABLE WATER SOFTENER
Filed Feb. 26, 1932   2 Sheets-Sheet 2

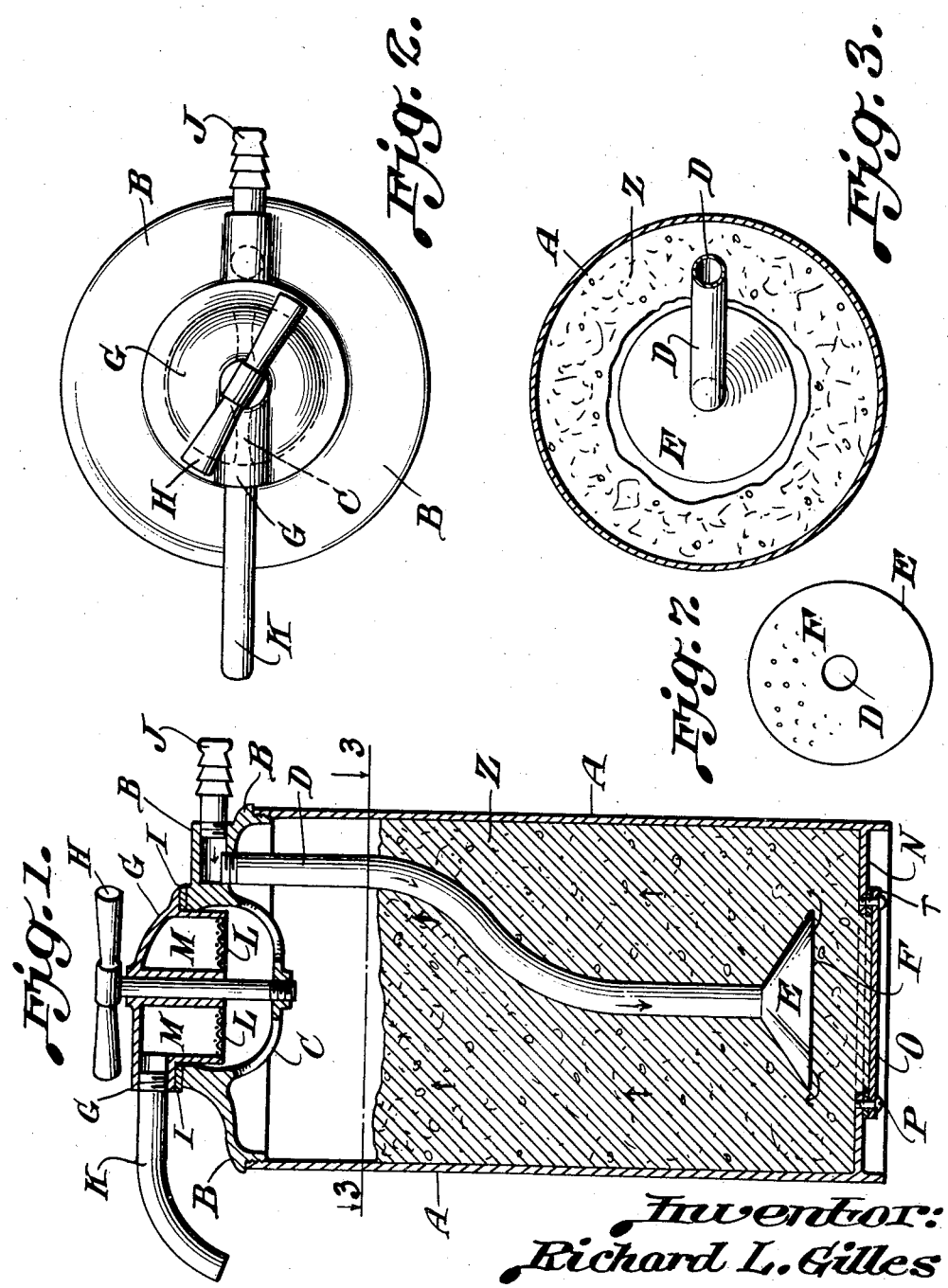

Inventor:
Richard L. Gilles
by Lester L. Sargent
Atty.

Patented Dec. 18, 1934

1,985,162

UNITED STATES PATENT OFFICE 1,985,162

PORTABLE WATER SOFTENER

Richard L. Gilles, Fargo, N. Dak.

Application February 26, 1932, Serial No. 595,357

5 Claims. (Cl. 210—24)

My invention relates to a portable water softener adapted to be connected to various water faucets for softening water at the places in which it is required, particularly to softeners using zeolite or other base exchange minerals as the medium for softening the water.

The particular object of my invention is to provide a means for the use of zeolite or other similar minerals in close confinement in a comparative small container and to provide means for controlling the distribution of water through the zeolite mineral bed, means for controlling the outlet and screening to prevent loss of mineral, and a means for the regeneration of the mineral bed in close confinement, also a means of quickly removing the mineral bed for cleaning.

I attain these and other objects of my invention by the mechanism illustrated in the accompanying drawings, in which—

Figure 1 is a vertical section through my invention;

Fig. 2 is a top plan view of same;

Fig. 3 is a horizontal section on line 3—3 of Fig. 1;

Fig. 7 is a bottom plan view of cone E and screen F.

Like characters of reference designate like parts in each of the several views.

Figure 5:
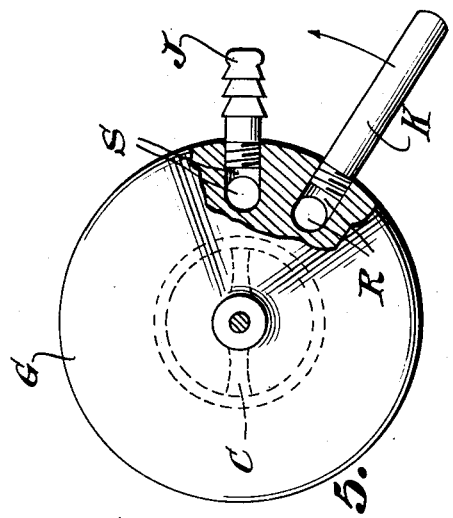
Fig. 5 is a horizontal section on line 5—5 of Fig. 4.

It is the usual practice in zeolite softener equipment to provide a bed of mineral with a comparative large freeboard, (water space above the mineral bed). This allows of a large movement or churning of the mineral bed and consequent shorter contact of water with the mineral. In regenerating such a mineral bed it is customary to merely add salt to the volume of water in the freeboard and as the salt dissolves this brine solution will work down through the mineral bed by gravity and regenerate the entire bed of mineral. On account of the constant churning of the mineral most of the silt or foreign matter in the water is passed through the mineral bed.

In a portable softener such as I have invented, with a comparative small amount of zeolite and a large freeboard of water, the capacity of softening and the rate of flow would be so small that it would be of no practical value.

In order to obtain the maximum of capacity and a high flow rate it is necessary to confine the mineral bed of zeolite and to distribute the water through this bed equally. Means must also be provided to retain the mineral and allow a free flow of water with a minimum of back pressure to prevent clogging of the outlet screen and a means of cleaning the outlet screen. Means must also be provided for the complete regeneration of the mineral bed other than a gravity method of salt brine.

My novel invention allows of the use of a closely confined bed of zeolite mineral, a means of distribution of water through this mineral bed, the retention of the mineral in the container, a means of keeping the outlet screen clean, and a method of regenerating the mineral bed. Other advantages and the method of operation will be brought out in the following descriptions.

Referring to Figs. 1, 2, 3, and 7 of the drawings, I provide a container body A (preferably cylindrical) to which is attached the top casting B and bottom casting N. I provide a cross member or spider C integral with the casting B and into which a wing screw H is inserted to hold down the top casting G and make a water-tight connection by means of a suitable gasket I. The top casting G has a screen L across its bottom face.

I provide an outlet spout K having an external thread at its end and screwed into the casting G as shown in Fig. 1. The head casting B is tapped and I provide a hose connector J screw-threaded into B and in communication with the inlet pipe D which extends to a point near the bottom of container A and terminates in a cone shaped spreader E at a position approximately concentric of the cylindrical walls of the container near the bottom of the container. The cone E is provided with a screen F extending across the bottom of the cone. The bottom casting N of the container is provided with a removable plate O which is removably attached by suitable screws P. I also provide a suitable gasket T. The zeolite mineral placed in the container A is designated as Z.

The operation is as follows. The container is filled with zeolite or other similar mineral to nearly the top of the container, leaving a comparative small freeboard or water space at the top. The water enters at the inlet nozzle J and flows down through pipe D and out through screen F. The water strikes the bottom and spreads out and is prevented from following directly up the center through the least resistance of the mineral bed as it is forced out and around by the distributor cone E. This causes a churning action of the mineral bed at the bottom and causes the entire bed of mineral to raise up until it reaches the top and presses against the comparative large screen outlet at the top. This causes two actions, the water passes through the mineral bed evenly in close contact and is softened and the pressure of the mineral bed against the screen outlet at the top prevents undue loss of mineral which would occur if the free board was large and not closely screened. This packing of the mineral against the outlet screen also causes a more even distribution of water through the bed and prevents channeling of the mineral.

As shown in Fig. 1, the space in the top between the face of the screen L and the outlet is comparatively large compared to the outlet into the spout K. This allows for an even flow of water throughout the entire face of the screen and causes a certain amount of back pressure in the space M, and this relieves some of the pressure on the screen L of the mineral below and allows a free flow of water through the spout K.

To regenerate the mineral bed, the top G is removed by unscrewing the thumb screw H which leaves the entire top open. Dry salt to the proper amount is poured into the container on top of the mineral bed and the top G is replaced. As the free amount of water is not sufficient to dissolve this amount of salt means are provided for this in two ways.

After the salt has been placed and the top screwed down, the inlet hose is removed from the connection J and attached to the outlet spout K. This reverses the flow of water and it then enters through the chamber M and passes through the screen L into the bed of salt and dissolves it and carries it down through the mineral bed regenerating the mineral and passing out up through the screen F, distributor E, pipe D, and out through outlet J. This backwashing of the salt through the mineral bed also tends to clean the screens and carry out silt or dirt collected at the bottom of the mineral bed.

In using the inlet and outlet screens F and L with a comparatively large area in comparison to the size of the container the pressure is reduced to a minimum and allows of a free flowing stream with little stress on the container. Another advantage of this type of screening is that the mineral bed is raised up and is in contact with the screen L which is horizontal to the mineral bed and when the water is turned off the mineral gravitates down and the water washing down from the chamber M above the screen cleans it and washes out any particles that might cling to the screen and keeps it clean.

Figure 6:
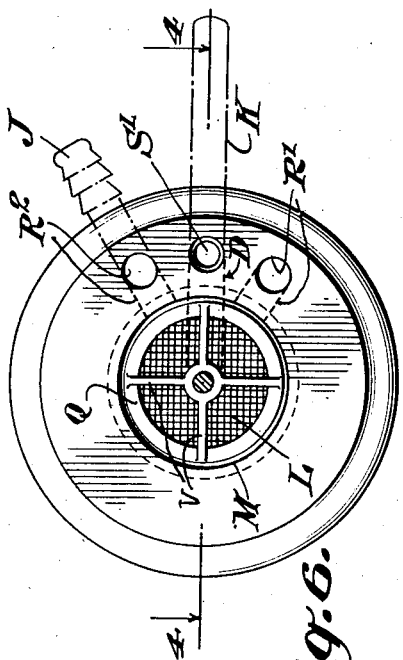
Fig. 6 is a horizontal section on line 6—6 of Fig. 4.
Figure 4:
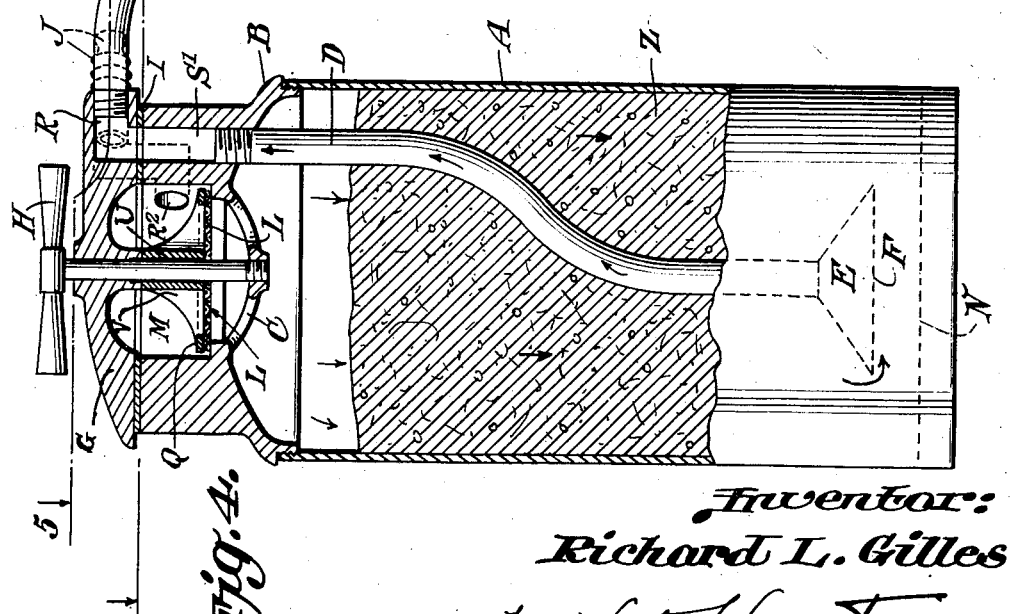
Fig. 4 is a view partly in side elevation and partly in vertical section of my invention with a modified form of head construction.

Referring to Figs. 4, 5 and 6 there is illustrated another form of my invention. I provide a modified form of top G to which both the spout K and the inlet connector J are attached or made a part of and which respectively connect with port openings R and S into the ports in the top of casting B. I provide a screen plate Q consisting of a circular ring with a screen L on the bottom and having a center tube U for the passage of the thumb screw H, and I also provide side support arms V to hold it together. This screen plate is practically the same as the lower half of the screen carrying part of top G of Fig. 1.

As shown in Fig. 6, there are three openings or ports in the rim of the casting B. One of these is designated as R1 in Fig. 3 and the other two as R2 and S' in Fig. 6. Ports R1 and R2 open into the chamber M above the screen L and these ports may be cast in the casting or drilled in the casting G. Port S, shown in Fig. 5, connects with pipe D and cone E the same as in Fig. 1 of the drawings. Gasket I seals the top and has the same ports. The outlet ports R and S in the top G are directly in line and over the ports R1 and S1 of the top casting B.

In the apparatus shown in Figs. 4, 5 and 6 with the device adjusted in the proper position for softening the water as shown in Fig. 5, the top G is placed with port R over port R1 and with port S over port S'. The water then enters through inlet J and flows down through ports S and S' and down through pipe D and cone E and screen F and thence up through the zeolite mineral Z, and through screen L into chamber M and thence through port R1 and R and out through the spout K as the water flows upward through the mineral bed.

For the automatic reversing of flow, the operation of the apparatus is as follows:

In the regenerating position the salt is poured into the container and the top replaced with the ports in the second position, as shown in Figs. 4 and 6, that is, with port R in the top directly over port S' in the body and port S of the top over port R2 in the body. Now the water enters through J, through port S in top, down through port R2 in the body and into chamber M, through screen L and over the top of the mineral bed dissolving the salt and taking it down through the mineral bed, regenerating the mineral, and then up through the screen in F and E, through pipe D, through port S and out through spout K, thus reversing the flow of the water through the softener without changing the hose connections.

What I claim is:—

1. In a water softening apparatus, the combination of a container, a head casting, a removable chambered top member, a series of port openings directly opposite each other in the top and in the head casting, an inlet connection opening into one of the openings in the top, an outlet connection communicating with another opening in the top, the top being revoluble to place the aforesaid ports over each other to permit of reversing the flow of water through the apparatus, and a pipe leading from the head casting to the lower portion of the container.

2. In a portable water softener, the combination of a container, a mineral bed occupying the major portion of the container, a casting head on the top of the container, a top removably mounted on the casting head, a relatively large outlet chamber in the casting head, a relatively large horizontally disposed outlet screen in said chamber, said screen being removable with the chambered top to permit of quick cleaning.

3. In a portable water softening apparatus, the combination of a container having a removable bottom member, a mineral bed filling the major portion of the container to leave only a small water space in the upper portion of the container, a chambered head casting removably attached to the container, a chambered and screened top member seated on the head casting, means for manually releasing and securing the chambered top member to the chambered head casting, an outlet conduit opening out of the top member, an inlet conduit in communication with the container, a pipe in communication with said inlet conduit and extending to a point near the bottom of the mineral bed, a screen cone member in which said pipe terminates to distribute the water thoroughly through the mineral bed to more effectually soften same.

4. In an apparatus of the type described in claim 3, a head having a spider member having a screw threaded opening therethrough to permit of engagement by the means for detachably securing the chambered top to the head casting.

5. In a portable softener or water treating device without valves adapted to be detachably connected to a water supply source, the combination of a container, a top casting removably mounted to the body of the container, a mineral bed filling the major portion of the container, a chambered removable head revolubly seated on the aforesaid top casting, said chambered head consisting of an expansion chamber, a horizontal screen of comparatively large area, an outlet conduit opening out of the expansion chamber for connection to the water supply, a water supply conduit extension from the top casting at a point above the horizontal screen in the chambered head downwardly inside the container and through a substantial portion of the mineral bed, a distributor near the bottom of the container in which said conduit terminates, said distributor consisting of a cone shaped member the bottom of said cone shaped member being covered with a screen, said elements forming a chamber of comparatively large area relative to the conduit supply pipe and presenting a screen area of large proportion over the bottom of the container to distribute and spread water and prevent the clogging of the screen and the channelling of the mineral.

RICHARD L. GILLES.